(No Model.)

J. F. & E. J. WILLIAMS.
FERTILIZER DISTRIBUTER.

No. 547,054. Patented Oct. 1, 1895.

Witnesses.
A. Ruppert.
H. A. Daniels.

Inventors.
James F. Williams
Elie J. Williams
Per
Thomas P. Simpson
Attorney

UNITED STATES PATENT OFFICE.

JAMES F. WILLIAMS AND ELIE J. WILLIAMS, OF KENNEDY, ALABAMA.

FERTILIZER-DISTRIBUTER.

SPECIFICATION forming part of Letters Patent No. 547,054, dated October 1, 1895.

Application filed May 7, 1895. Serial No. 548,406. (No model.)

*To all whom it may concern:*

Be it known that we, JAMES F. WILLIAMS and ELIE J. WILLIAMS, citizens of the United States, residing at Kennedy, in the county of Lamar and State of Alabama, have invented certain new and useful Improvements in Fertilizer-Distributers; and we do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a fertilizer-distributer which will subdivide the fertilizer before it is discharged on the ground, be constructed to drill the manure or drop it in hills, and be provided with means for regulating the quantity of manure to a given number of square yards.

Figure 1:
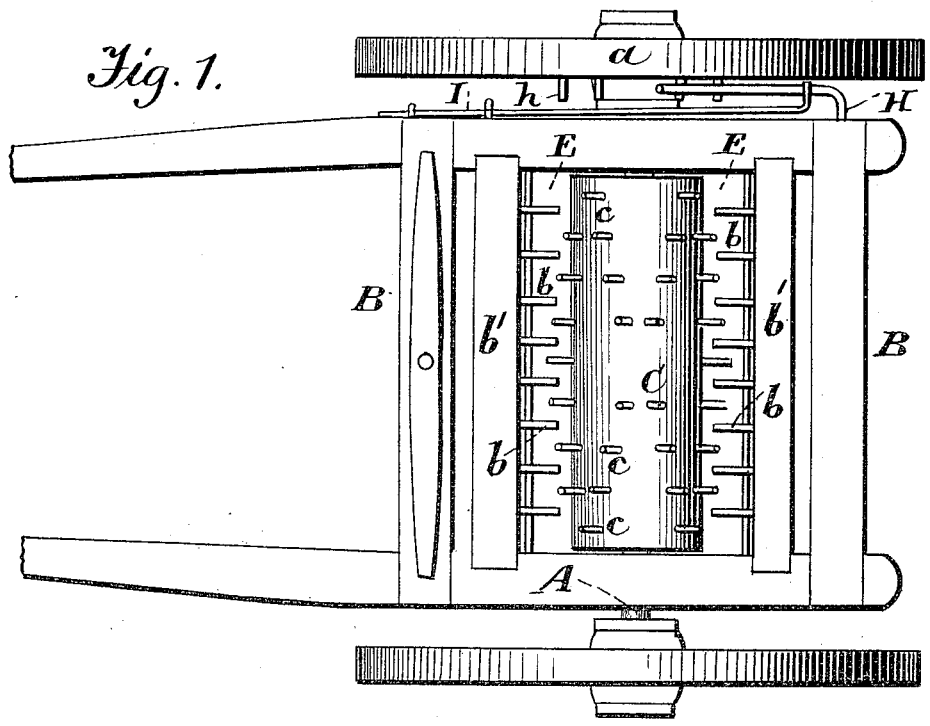
Figure 2:
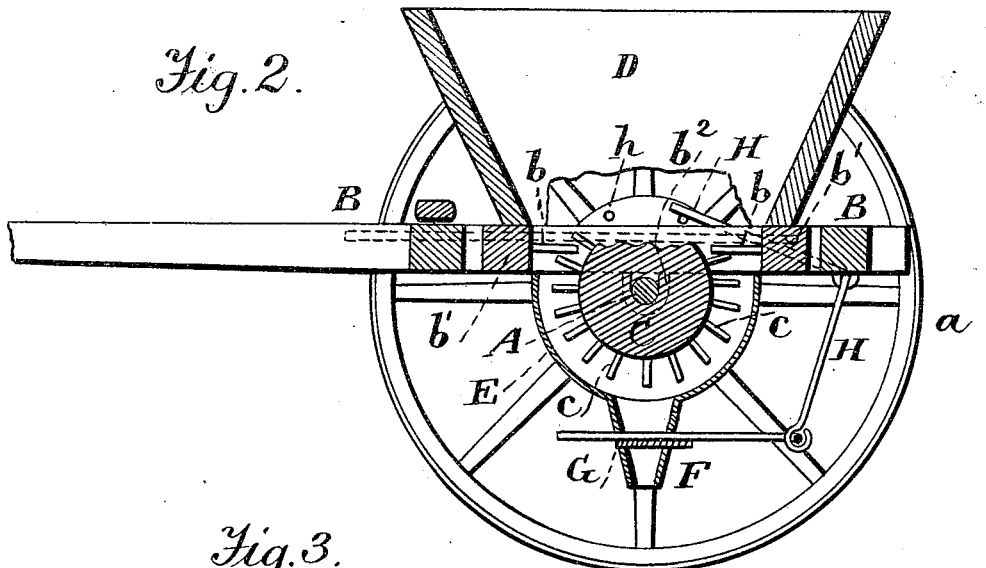
Figure 3:
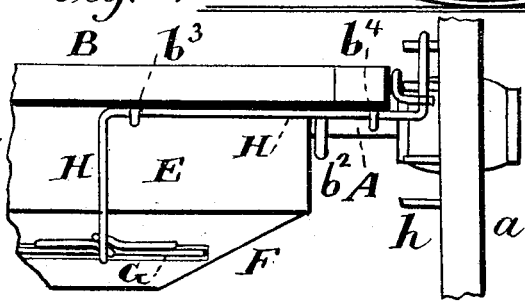

Figure 1 of the drawings is a plan view with the hopper removed; Fig. 2, a longitudinal vertical section, and Fig. 3 a vertical cross-section.

In the drawings, A represents the axle of our fertilizer-distributer provided with one wheel $a$, which is fast thereon, so that the axle may be rotated, and another wheel, which is loose on the axle to allow the vehicle to turn properly. The axle is journaled in bearings $b^2$ $b^2$ under the frame B and carries in the middle thereof a roll or cylinder C, which is provided with obtuse-angled rows of spikes $c$ across its face to run between the spikes $b$ on the cross-bars $b'$ $b'$ of the frame.

D is the hopper, in which the manure or fertilizer is carried over the land which is to be fertilized, the said fertilizer passing around the spiked cylinder into the concave E and down into its discharge-spout F.

G is a dropper-slide which works in the spout F and may be adjusted so as to drill a greater or less quantity to the acre, while it may be operated intermittently to drop into hills at a greater or less distance apart. In order to drop in checks, we connect the slide G pivotally with a lever H, which is bent at right angles to pass through an eyebolt or staple $b^3$ on the under side of the frame B and afterward carried through another eye or staple $b^4$. Then it is again bent at a right angle and carried along the inside of a wheel-disk carrying the laterally-projecting pins $h$, arranged in a circle thereon. These pins lift the outer end of the lever H, so as to close the discharge-spout in passing from hill to hill, when they let it go, and the spring I presses the lever down, so as to open the slide or valve G. These pins $h$ are made detachable, so as to drop in conformity to the distance of the hills apart.

If it is desired to drill the fertilizer continuously in the furrow, the pins are all removed, when the spring I will hold the lever H down and keep the dropper-slide retracted.

Having thus described all that is necessary to a full understanding of our invention, what we claim as new, and desire to protect by Letters Patent, is—

In a manure distributer, the combination with a hopper, concave and discharge spout substantially as shown, of a dropper slide G in the discharge spout, a lever H bent to carry it through the staples $b^3$ $b^4$, a spring I arranged to press on the lever, and a wheel-disk having the side-pins $h$ which lift the lever in the manner and for the purpose specified.

In testimony whereof we affix our signatures in presence of two witnesses.

JAMES F. WILLIAMS.
ELIE J. WILLIAMS.

Witnesses:
DANIEL COLLIER,
JAMES J. RAY.